Oct. 29, 1968 W. E. BALDWIN 3,407,486

METHOD FOR ALTERING THE CONFIGURATION OF ELECTRICAL COILS OF INDUCTIVE DEVICES

Original Filed Dec. 10, 1965 10 Sheets-Sheet 1

Inventor:
William E. Baldwin,
by John M. Stoudt
Attorney.

Oct. 29, 1968 W. E. BALDWIN 3,407,486
METHOD FOR ALTERING THE CONFIGURATION OF ELECTRICAL COILS OF INDUCTIVE DEVICES
Original Filed Dec. 10, 1965 10 Sheets-Sheet 2

Inventor
William E. Baldwin,
by John M. Stoudt
Attorney.

Inventor:
William E. Baldwin,
by John M. Stoudt
Attorney.

INVENTOR:
William E. Baldwin
BY John N. Stoudt
ATTORNEY

Oct. 29, 1968 W. E. BALDWIN 3,407,486

METHOD FOR ALTERING THE CONFIGURATION OF ELECTRICAL COILS OF INDUCTIVE DEVICES

Original Filed Dec. 10, 1965 10 Sheets-Sheet 5

STANDBY CONDITION

INVENTOR:
*William E. Baldwin*
BY *John M. Stoudt*
ATTORNEY

Oct. 29, 1968 W. E. BALDWIN 3,407,486
METHOD FOR ALTERING THE CONFIGURATION OF
ELECTRICAL COILS OF INDUCTIVE DEVICES
Original Filed Dec. 10, 1965 10 Sheets-Sheet 6

LOW LEVEL CHARGE CONDITION

INVENTOR:
William E. Baldwin
BY John E. Stoudt
ATTORNEY

LOW LEVEL CHARGE FIRING CONDITION

INVENTOR:
William E. Baldwin
BY John M. Stoudt
ATTORNEY

HIGH LEVEL CHARGE START CONDITION

INVENTOR:
*William E. Baldwin*
BY *John M. Stoudt*
ATTORNEY

HIGH LEVEL CHARGE FIRING CONDITION

INVENTOR:
*William E. Baldwin*
BY *John M. Stoudt*
ATTORNEY

HIGH LEVEL CHANGE CONDITION

INVENTOR:
William E. Baldwin
BY John M. Stoudt
ATTORNEY

United States Patent Office 3,407,486
Patented Oct. 29, 1968

3,407,486
METHOD FOR ALTERING THE CONFIGURATION OF ELECTRICAL COILS OF INDUCTIVE DEVICES

William E. Baldwin, Fort Wayne, Ind., assignor to General Electric Company, a corporation of New York
Original application Dec. 10, 1965, Ser. No. 513,028. Divided and this application Sept. 20, 1967, Ser. No. 669,156
6 Claims. (Cl. 29—596)

ABSTRACT OF THE DISCLOSURE

A method for effecting electrical coil transforming operations in which the coil and its magnetic core member are arranged in a load circuit having electrical terminals at a first or load circuit connection station, and then are transported into a second or an enclosed electrical surge supply station where an electrical connection is made with the load circuit through its electrical terminals to an electrical energy surge supply circuit for injecting an electrical energy surge into the coil to effect the desired coil transformation. At the first station another coil and its magnetic core member are arranged in another load circuit for subsequent transportation to the second station. This procedure is efficient and economical, capable of safe utilization in the mass production manufacture of inductive devices, for example motors.

*Cross references to related applications*

This application is a division of my co-pending application Serial No. 513,028 filed December 10, 1965.

*Background of the invention*

The present invention relates generally to an improved method for altering the configuration of electrical coils and to a method for accomplishing this result. More specifically, it relates to an improved method, suitable for use in the production of electrical motors, that can be used efficiently and economically to accomplish various manufacturing operations on electrical coils of a motor, such as the insertion of the turns of the electrical coil into the winding slots, compaction of the conductor turns in the winding slots, pressing back of the end turns of the motor winding, and other coil transforming operations.

In the manufacture of electrical inductive devices, such as magnetic stator cores of fractional horsepower motors, it is necessary that a number of electrical coils be inserted, positioned and packed in the coil accommodating slots of the magnetic core. Conventionally, mechanical devices have been employed to perform the necessary coil transforming operations. In the United States Patents 3,333,-327—Larsen; 3,333,328—Rushing; 3,333,329—Linkous; 3,333,330—Linkous; and 3,333,335—Sims, all assigned to the assignee of the present application, new and improved concepts are disclosed for performing various coil transforming operations by the utilization of electrical energy rather than by brute force techniques.

In some applications of these new coil manufacturing concepts, it is necessary to inject a plurality of high energy rate pulses or surges directly into the coils of an inductive device or into a coil inductively coupled with the coil. The supply circuits that produce such high energy rate surges are inherently dangerous to operating personnel since they generally utilize a capacitor bank charged to relatively high voltages which may range from a thousand to 4,000 voltages. Also, when the high energy rate surges are injected in a defective winding, high voltage flashing may occasionally occur that may create hazards to personnel. It is therefore desirable that the injection of the high energy rate surges be carried out at a location remote from operators and under conditions to minimize any electrical hazard to operating personnel. Since it is desirable that the apparatus be adaptable for use in the mass production of inductive devices, it should be, of course, capable of efficient and economical operation and should readily be integrated into a manufacturing assembly line for producing inductive devices.

Accordingly, it is a principal object of my invention to provide an improved method for carrying out manufacturing operations on electrical coils or portions thereof.

It is another object of the present invention to provide a safe and efficient method for performing the manufacturing operations on an inductive device, such as, for example, compacting the conductor turns of coils disposed in the slots of a magnetic core and pressing back end turns.

*Summary of the invention*

Briefly stated, in accordance with one form of the present invention, I have provided an improved method for effecting a coil transforming operation on at least one coil of a magnetic core member which may be efficiently and economically practiced on a mass production basis. Initially a first coil and the magnetic core member are arranged in a first load circuit at a first station, a load circuit connection station, the load circuit including terminal members adapted for connection with an electrical surge supply circuit. The load circuit having the first coil and magnetic core member therein is transported to a second station, as by a turntable having the first and second stations disposed in angularly spaced apart locations.

After the load circuit is enclosed at the second station, an electrical surge supply or injection station, an electrical connection or coupling is established with an electrical energy surge supply circuit, and at least one electrical energy surge is injected into the first coil to effect the desired coil transformation.

At the first station another or second coil and magnetic core member are arranged in another load circuit, and upon completion of the first coil transformation at the second station, it is transported out of the enclosure to the first station where it is removed and replaced by yet another coil and magnetic core member. During this transfer the load circuit with its associated coil disposed at the first station is transported into the second station for transformation of the coil.

This procedure is efficient and economical in nature, rapidly and effectively producing the desired coil transformation by a process capable of use in the mass production manufacture of electrical devices, for instance, motors. Moreover, in spite of the employment of a surge of electrical energy to effect the desired coil-transformation operations, the transformation may be safely achieved. Other advantages and benefits of the invention will become more apparent as the description proceeds.

The subject matter which I regard as my invention is particularly pointed out and distinctly claimed in the concluding portion of this specification. My invention, however, both as to organization and method of operation, together with further objects and advantages thereof, may be best understood with reference to the following description taken in conjunction with the accompanying drawings.

*Description of the preferred embodiment*

Figure 1:
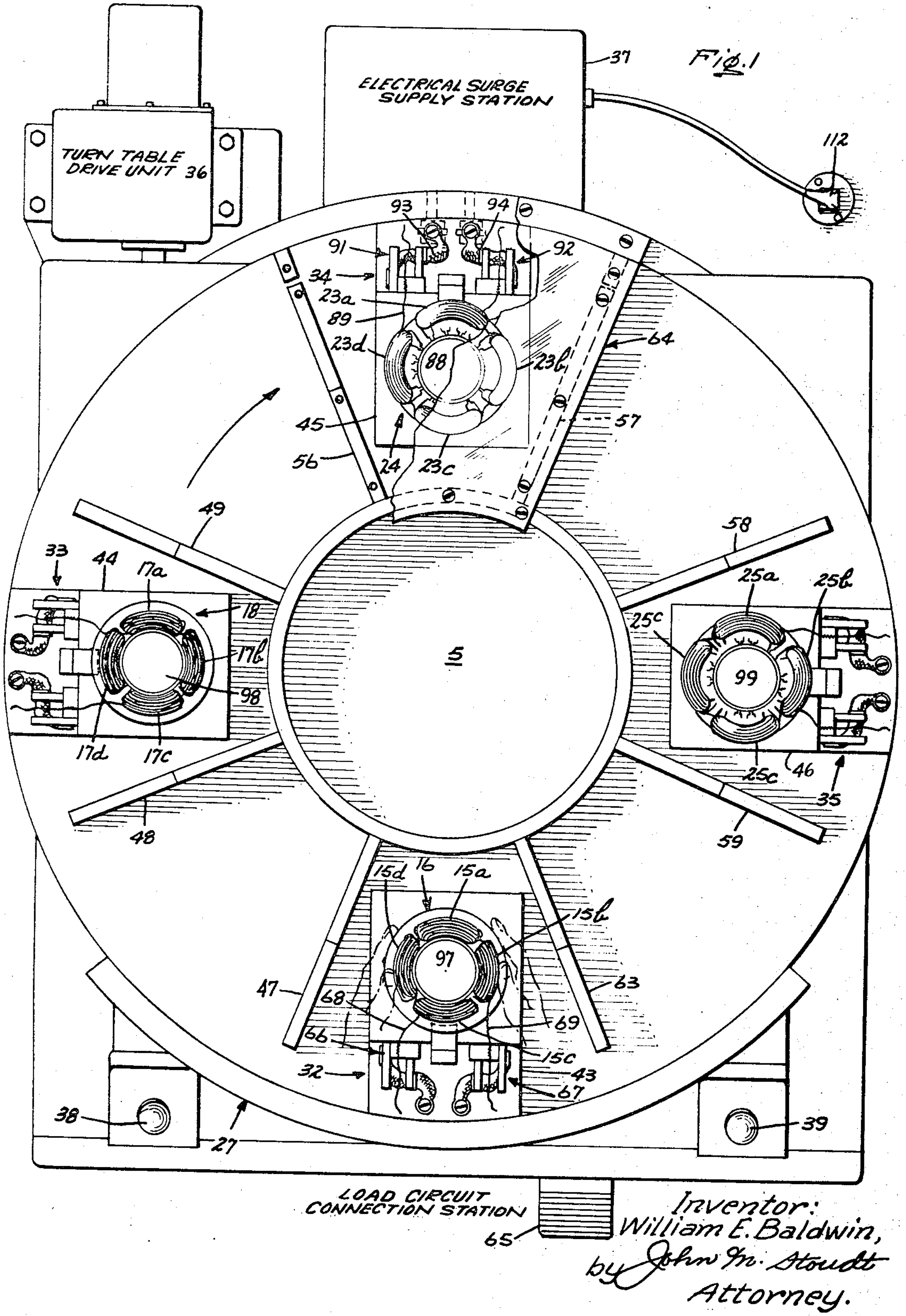
FIGURE 1 is a plan view of apparatus capable of carrying out one form of my improved method with the plastic glass enclosure at the electrical surge injection station being broken away to show the connections and motor stator arrangement at this station.
Figure 2:
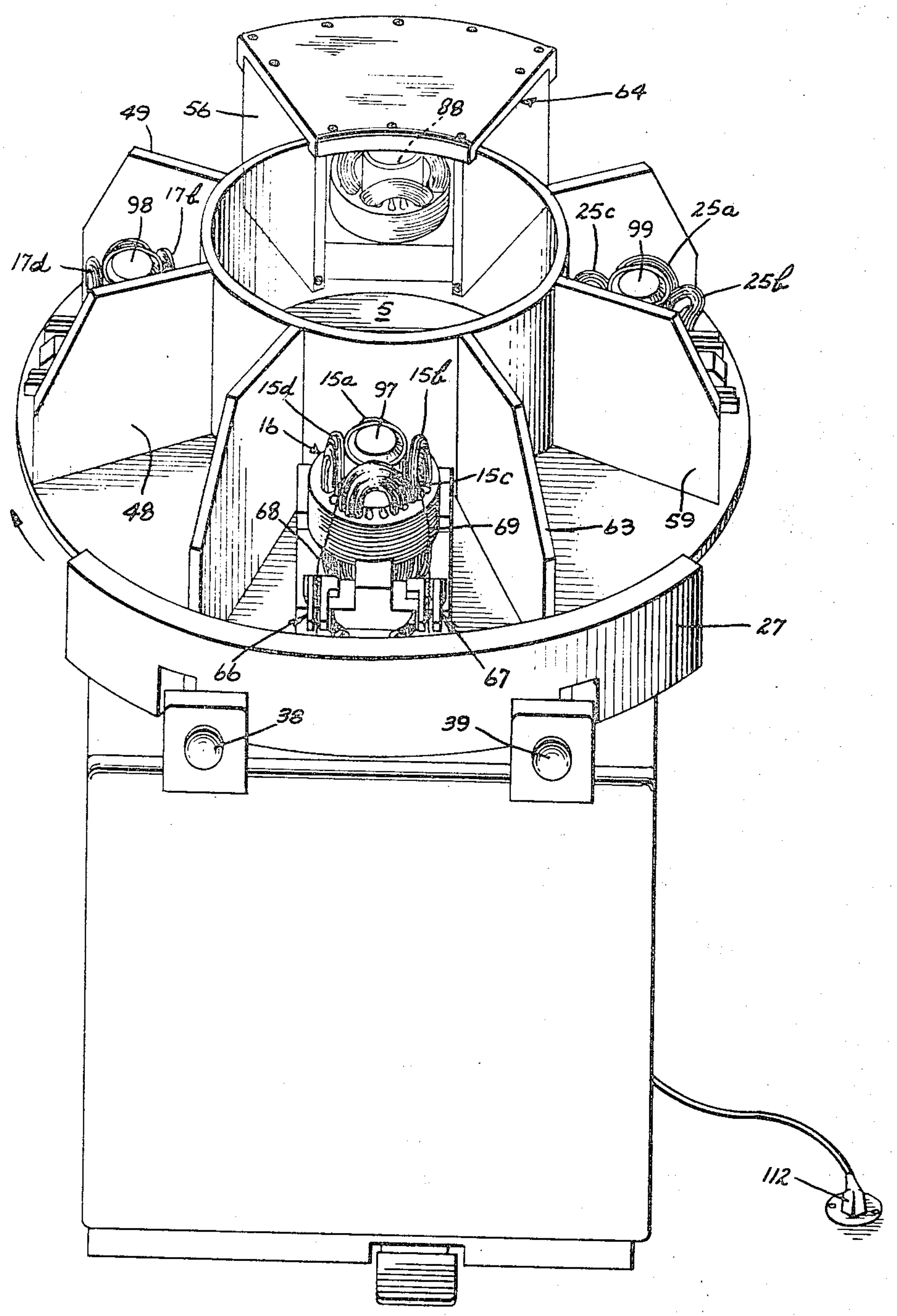
FIGURE 2 is a front view in perspective of the improved apparatus showing the arrangement at the load circuit connection station.

Having more specific reference now to FIGURES 1 through 4, I have illustrated therein apparatus 5 capable of carrying out one form of my improved method for altering the configuration of coils 15*a*, 15*b*, 15*c* and 15*d* of a magnetic stator core 16 of a fractional horsepower motor (not shown) and coils 17*a*, 17*b*, 17*c* and 17*d* of a stator core 18, the coil transforming operation having been completed on coils 23*a*, 23*b*, 23*c* and 23*d* of a stator core 24 and on coils 25*a*, 25*b*, 25*c* and 25*d* of a stator core 26. In the illustrated exemplification of my invention, apparatus 5, which is capable of practicing one form of the improved method, includes a conveyor or other transporting means, such as turntable 27, four load circuits 32, 33, 34 and 35, a turntable drive unit 36, an electrical surge supply circuit enclosed in a housing 37, a surge supply circuit pushbutton switch 38, a turntable indexing switch 39, and fixtures 43, 44 and 45 for supporting the motor stator coreh 16, 18, 24 and 26.

The turntable 5 is fabricated of electrically insulating material such as fibre glass or a phenolic plastic such as Bakelite. It will be noted that the turntable 5 is provided with eight upstanding radially extending partitions 47, 48, 49, 56, 57, 58, 59 and 63 defining eight partitioned sections, four of which contain the load circuits 32, 33, 34 and 35. At the electrical surge supply station a canopy 64 overhangs the partitioned section formed by partitions 56 and 57 to provide an enclosure for the load circuit at this station. Preferably, the canopy 64 is made of transparent insulating material to permit visual observations to be made of the stator core at the electrical surge supply station. It will be understood, of course, that the enclosure protects the operator against possible injury in the event that a coil shorts out or some other mishap occurs at the electrical surge supply station.

Figures 3, 4:
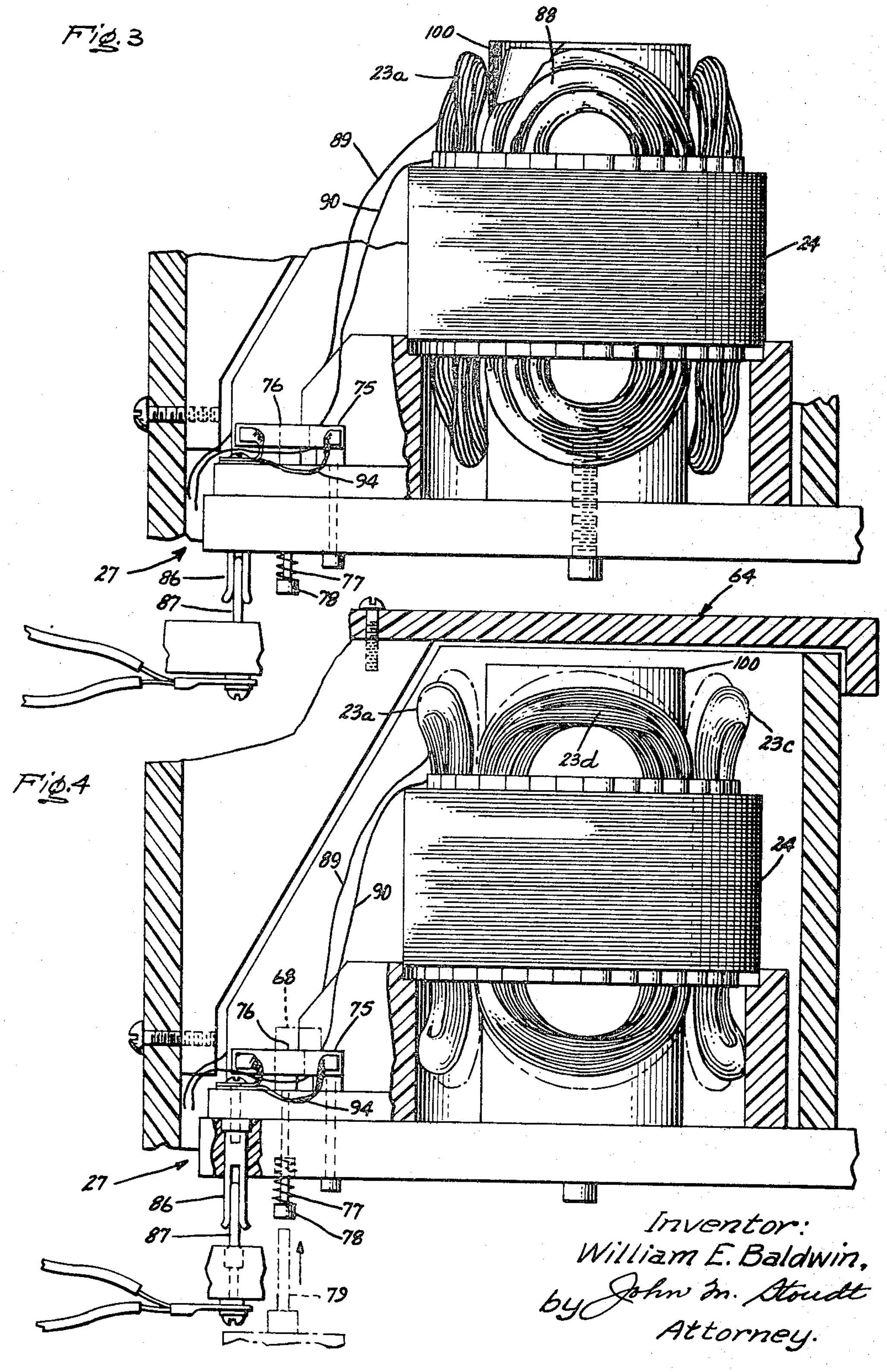
FIGURE 3 is an enlarged partial side view at the energy pulse injection station, partly in cross section and broken away to show details, the windings of the motor stator being shown before the electrical surges are discharged through the coils of a magnetic core.
FIGURE 4 is an enlarged view similar to the view shown in FIGURE 3 illustrating details of the load circuit at the electrical surge injection station, the motor stator coils being shown as they appear after two energy surges have been applied to the coils.

It will be seen that at the load circuit connection station a foot pedal 65 is provided to allow the operator to open the left and right connectors 66 and 67 (FIGURE 1) so that the left and right leads 68 and 69 of the stator winding can be quickly connected in the load circuit 32. As is best seen in FIGURE 4 a connector, only one of which is shown, consists of a fixed jaw 75 and a movable jaw 76. The movable jaw 76 is biased by a spring 77 into engagement with the fixed jaw 75. A pusher rod 78 attached to the movable jaw 75 extends downwardly from the turntable 27. When the foot pedal 65 is depressed at the load circuit connection station, the pusher rod 78 is actuated by a pneumatic piston 79 (shown in phantom outline) located at the load circuit connection station and the movable jaws 76 are moved vertically upward to open the connectors. With the jaws 75, 76 in the open position, the lead wires from the stator winding are inserted between the jaws 75, 76 and when in place the operator takes his foot off the foot pedal 65.

In the illustrative exemplification of my invention the lead wires of a stator winding are connected to the connectors of a load circuit at the load circuit connection station where as yet there is no electrical connection between the load circuit and the electrical surge supply circuit. An electrical connection between the electrical surge supply circuit and the lead wire is established only when the load circuit with the stator winding connected therewith is transported to the electrical surge supply station. At each partitioned section of the turntable 27 the connectors of each load circuit are joined electrically with input contact members 86 which extend vertically downwardly underneath the turntable 27. These pronged contact members 86, two of which are associated with each load circuit, engage a pair of stationary output contact members 87 which extend vertically upward underneath the turntable 27 at the electrical surge supply station. Thus, at the electrical surge supply station an electrical connection is established between the electrical surge supply circuit and the load circuit. In the illustrative exemplification of my invention, the load circuit shown at the electrical surge supply station includes a cylindrical member 88, the magnetic core 24, the coils 23*a*, 23*b*, 23*c* and 23*d*, the lead wires 89, 90, leads 93, 94, the input contact members 86 and the output contact members 87. As is shown in FIGURES 3 and 4, the output contact members, only one of which can be seen, are connected to output leads 95, 96 of the electrical surge supply circuit. It will be noted that the other load circuits 32, 33 and 35 also include a cylindrical member 97, 98 and 99 respectively. These cylindrical members are made of electrically conductive non-magnetic material, such as copper, and produce a repulsive effect in the conductor turns when the coils are pulsed. Referring again to FIGURES 3 and 4, it will be seen that a cardboard tube 100 is provided between the bore of the stator 24 and the cylindrical member 88. It will be appreciated that the tube 100 was inserted in the bore after the coil insertion operation to prevent conductor turns from falling out of the stator slots. Preferably, these tubes may be left in place while the coils are being pressed back and compacted in the improved apparatus 5 of my invention. When turntable 27 is indexed to transport the load circuit 33 (see FIGURE 1) to the electrical surge supply station, the load circuit 33 is connected with the electrical surge supply circuit as the input contact members underneath the turntable 27 engage the stationary contact members of the energy surge supply circuit. As the turntable is indexed, the contact members of the load circuit moving away from the electrical surge supply station become disengaged from the stationary contact members of the electrical surge supply circuit.

In the illustrated exemplification of the invention the turntable 27 is rotated in a clockwise direction through 90 degrees when the operator depresses the index switch 39.

Any number of well-known power drive systems such as a gear motor or pneumatic motor, may be employed to drive the turntable 27. As will be seen in FIGURE 1, the index switch 39 is conveniently located at the right side of the operator. Although in the specific embodiments of my invention I have shown the method in connection with a turntable 27 with four load circuits, it will be appreciated that additional load circuits may be employed.

Before proceeding with a more detailed description of the energy surge supply circuit, I will now describe the overall operation of the apparatus and the various steps performed by the operator in carrying out my invention. Referring again to FIGURE 1, which illustrates the apparatus 5 with four stators in place, it will be seen that the operator has just placed a stator core 16 in position so that the cylindrical member 97 extends through the stator bore. With the stator core 16 in position, the operator then depresses the foot pedal 65 to open up the jaws of the connectors 66, 67, inserts the lead wires 68, 69 into the jaws and takes his foot off the foot pedal 65 to make a connection therewith. Having completed this step, he depresses the index button 39 to rotate the turntable 90 degrees and bring a completed stator to the load circuit connection station. Also, at the same time a motor stator previously connected is rotated to the electrical surge discharge station. When the turntable 27 stops, the operator depresses the pushbutton switch 38 to initiate the operation of the electrical surge supply circuit. The operator again depresses the foot pedal 65 to open the jaws of the connectors in order to disconnect the lead wires of the winding of the stator core which has just been transported to the load circuit connection station. The stator core is removed from the cylindrical member and is placed on a conveyor or other transporting means so that the motor stator can be moved to another location where other manufacturing operations can be carried out on the stator core. The operator places another motor stator requiring coil transforming operations on the cylindrical member and depresses the foot pedal 65 to connect the main winding of this stator core in the load circuit. During this period, the electrical surge supply circuit has injected a first and a second surge of electrical energy into the coils. The first surge of electrical energy effects a press back of the conductor turns into the slots at an energy level sufficient to effect the movement of the wires without shorting conductors adjacent to the uninsulated parts of the stator core. The second surge of electrical energy effects a compaction of the conductors in the stator slots and brings about the desired pressback of the end turns.

Normally the removal of the stator from the load circuit at the load circuit connection station and the placement of a new stator core should require no more time than is required to inject the two surges successively through the stator winding at the electrical surge supply station. Accordingly, by the time the operator has positioned and secured a new stator core in the load circuit the coil transforming operations on the coils of the motor stator at the electrical surge supply station will have been completed, and the operator can press the index pushbutton 39 to again rotate the turntable 27 through 90 degrees and to commence another cycle of operation.

Having more specific reference now to FIGURES 5 to 11, I will now more fully describe the electrical surge supply circuit which is adapted to inject a first surge of electrical energy into the stator winding of the exemplification by discharging a capacitor bank consisting of capacitors $C_1$, $C_2$ and $C_3$, charged to a preselected voltage level, charging the capacitor bank to a second preselected level, and discharging the capacitor bank to inject a second surge of electrical energy. It was found that a first preselected low level charge of about 1,000 volts and a high level charge of 2,000 volts was sufficient to provide the desired alterations in the configuration of the coils. The energy level which must be injected into the winding will depend upon a number of factors such as the wire size, the overall geometry of the coils, the type of wire insulation, and the configuration of the cylindrical member of the load circuit.

The high energy rate surges or pulses are obtained by discharging a capacitor bank consisting of the capacitors $C_1$, $C_2$, and $C_3$. The energy level of the capacitor bank is sensed by two meter relays $M_1$ and $M_2$. The signal coils 102, 103 of the meter relays $M_1$ and $M_2$ are connected in series with resistors $R_1$ and $R_2$, respectively, and with ground G thereby placing the serially connected relay meter $M_1$ and resistor $R_1$ and the serially connected meter relay $M_2$ and resistor $R_2$ in parallel with each other across the capacitor bank. The resistors $R_1$ and $R_2$ are used to reduce the current flow through the meter relays $M_1$ and $M_2$ to signal current values.

As will hereinafter be more fully explained, the relay meter $M_1$ was adjusted to establish the low charge level to which the capacitor bank is charged while relay meter $M_2$ is adjusted to establish the high charge level. The meter relay $M_1$ has a high and a low limit setting. The low limit (low voltage) setting is reached when the meter pointer 104 engages contact 105 while the high limit (high voltage) setting of meter relay $M_1$ is reached when the voltage charge on the capacitor bank reaches a preselected high level wherein the meter pointer 104 engages the meter contact 106. Similarly, the engagement of the meter pointer 107 with meter contacts 108 and 109 determines the low and high limits of meter relay $M_2$. Low limit of meter relay $M_1$ is set slightly higher than the lower limit of the meter relay $M_2$ to insure that during the capacitor discharge cycle, contact 105 is engaged by meter pointer 104 an instant before meter pointer 107 engages contact 108 to allow the high charge level branch of the control circuit to become energized after the initial discharge. I will hereinafter more fully describe how this is accomplished. Also, it should be noted that the high limit of meter relay $M_2$ is set considerably higher than the high limit setting of meter relay $M_1$, since the high limit setting of meter relay $M_2$ determines the energy level to which the capacitor bank is charged.

Figure 5:
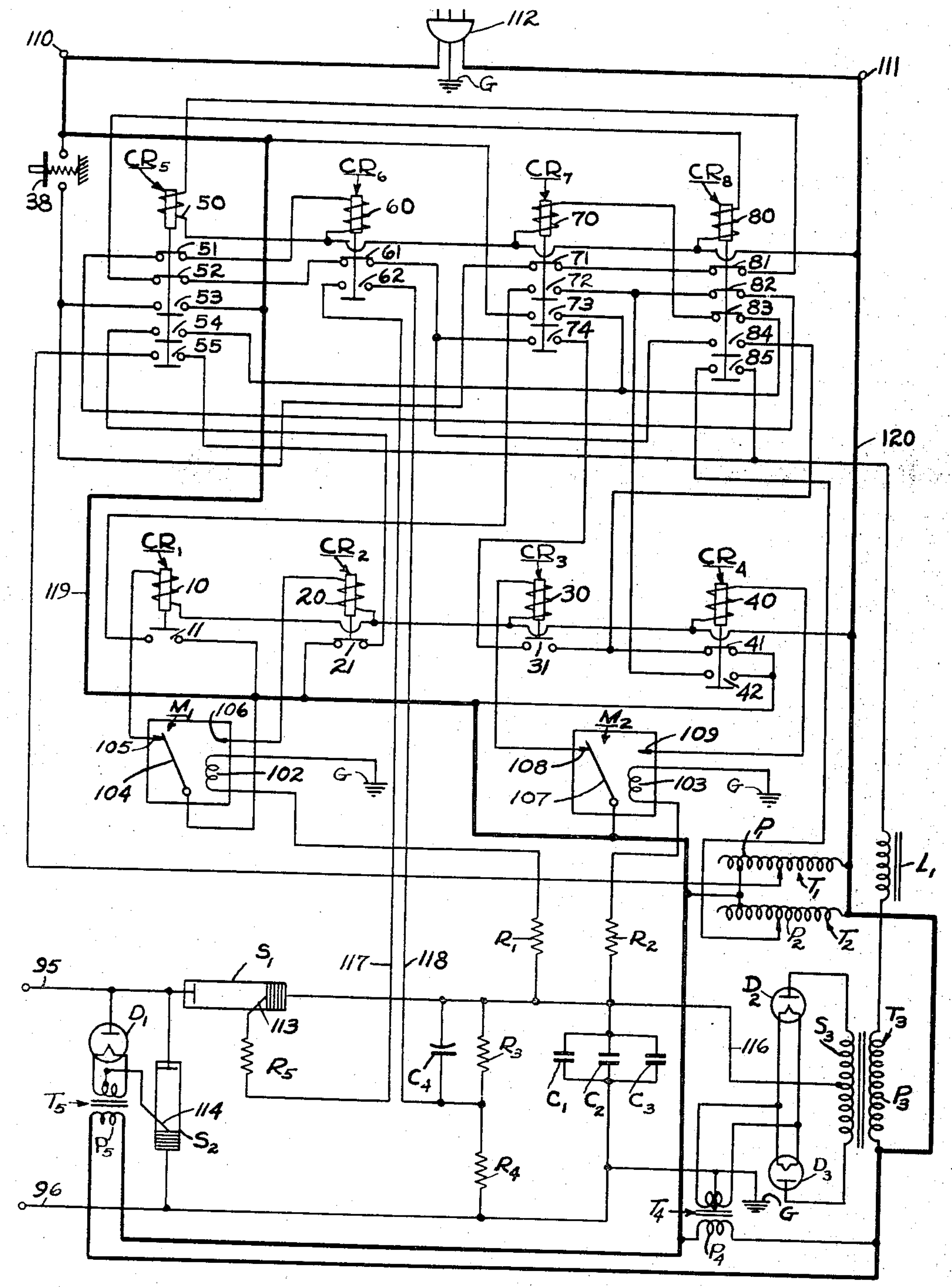
FIGURE 5 is a schematic circuit diagram of the energy surge supply circuit.

As will be seen in FIGURE 5, input terminals 110, 111 are connected with a standard three-conductor cord having a three pronged plug 112 for insertion in a standard grounded type receptacle of a 120 volt, 60 cycle power source. In the interest of simplification, I have not shown in the schematic circuit diagram of FIGURE 5 a time delayed on-off switch arrangement which is normally used in circuits utilizing hot cathode mercury rectifiers to insure that the cathodes of the rectifiers $D_1$, $D_2$ and $D_3$ are heated before plate voltage is applied. It will be understood, of course, that the primary windings $P_4$, $P_5$ of the filament transformers $T_4$, $T_5$ must be energized for a fixed interval of time (about 30 seconds) before the charging circuit is energized to allow the cathodes of the rectifiers $D_1$, $D_2$ and $D_3$ to warm up. A suitable circuit arrangement for insuring that this time delay is provided is shown in United States Patent No. 3,333,328 granted to R. G. Rushing on Aug. 1, 1967, and assigned to the same assignee as the present invention.

An electrical energy surge is provided at the output terminals 95, 96 by switching an ignitron $S_1$ into conduction when the capacitor bank $C_1$, $C_2$ and $C_3$ is charged to a predetermined level. The second ignitron $S_2$ is utilized to suppress large oscillatory voltages that might shorten the life of the capacitors $C_1$, $C_2$ and $C_3$. When a damped oscillatory condition occurs, the polarity of the voltage across the output terminals 95, 96 reverses to cause the voltage on the plate of rectifier $D_1$ to become positive and rectifier $D_1$ conducts thereby causing a positive potential to be applied at the starter rod 114 of ignitron $S_2$. Ignitron $S_2$ is fired and provides a path for reverse current flow which shunts the capacitor bank $C_1$, $C_2$ and $C_3$. Ignitrons $S_1$ and $S_2$ used in the exemplification of the invention were mercury-pool cathode-arc rectifiers with starter rods 113, 114 respectively immersed in a mercury pool. When a positive potential is applied at a starter rod of an ignitron, sparking occurs at the junction of the rod and mercury pool causing a cathode spot to form, and the ignitron is switched into conduction.

It will be seen from the schematic circuit diagram shown in FIGURE 5 that two parallel-connected variable control autotransformers $T_1$ and $T_2$ control the voltage applied across the primary winding $P_3$ of a transformer $T_3$. In order to limit the peak current in the primary winding $P_3$, a choke $L_1$ is provided in series with the primary winding $P_3$. To provide a full-wave rectified current for charging the capacitors $C_1$, $C_2$, and $C_3$, a pair of high voltage rectifiers $D_2$ and $D_3$ are connected across the secondary winding $S_3$ in a well-known full-wave rectifier configuration. The full-wave rectified output is brought out at the center tap 116 of the secondary winding $S_3$. The rectifiers $D_2$ and $D_3$ alternately conduct as the polarity of the input voltage across the primary winding $P_3$ changes.

A capacitor $C_4$ in the firing circuit of ignitron $S_1$ is also charged during the operating condition of the capacitor discharge circuit through a voltage divider consisting of resistors $R_3$ and $R_4$. Two leads 117, 118 are brought out from the firing circuit to control relay $CR_6$. When contacts 62 are closed, capacitor $C_4$ is discharged to provide a positive signal at the starter rod 113 of ignitron $S_1$. A resistor $R_5$ is connected in the firing circuit $C_4$ in order to control the discharge rate of the capacitor $C_4$.

As is shown in FIGURE 5, the electrical surge supply circuit consists of a control circuit portion and a capacitor discharge circuit portion, the supply lines 119, 120 being shown as heavy lines. The control circuit portion includes meter relays $M_1$, $M_2$, relays $CR_1$, $CR_2$, $CR_3$, and $CR_4$, which are controlled by the relay meters $M_1$ and $M_2$, and four additional control relays $CR_5$, $CR_6$, $CR_7$, and $CR_8$.

It will be seen in FIGURE 5 that the control portion of the circuit is coupled with the capacitor discharge circuit by means of the signal coils 102, 103 of meter relays $M_1$ and $M_2$, relay contacts 62 and relay contacts 55 and 85. Signal coil 102 of meter relay $M_1$ is used in the low charge level branch of the control circuit while signal coil 103 of meter relay $M_2$ comes into play to sense the high charge level of the capacitor bank. During the standby condition the filament transformers $T_4$ and $T_5$ are energized and the cathodes of the rectifiers $D_1$, $D_2$, and $D_3$ are heated. However, the primaries $P_1$, $P_2$, $P_3$ of the variable transformers $T_1$, $T_2$, and transformer $T_3$ are not energized. Since there is no current flow in the capacitor discharge portion of the circuit, the meter pointers 104, 107 on the meter relays $M_1$ and $M_2$ will be in the low limit positions wherein meter pointer 104 engages contact 105 and the meter pointer 107 engages contact 108. The coils 10 and 30 of control relays $CR_1$ and $CR_3$ are energized because in the standby condition the low limit switches (meter pointer 104, contact 105 and meter pointer 107, contact 108) are closed and coils 10, 30 are connected across the supply lines 119, 120. In the standby condition the electrical surge supply circuit is ready to be energized by depressing the pushbutton switch 38.

It should be noted that the relay contact 62 is normally open and that to fire the ignitron $S_1$ control relay coil 60 has to be energized. Control relay contacts 55 of the control relay 5 are normally open and when closed cause the voltage of the autotransformer $T_1$ to be applied across the primary winding $P_3$ to start the low level charge condition. For the high level charge condition relay contacts 85 of the control relay 8, which are normally open, apply the voltage of the autotransformer $T_2$ across the primary winding $P_3$ of transformer $T_3$ to start the high level charge condition of the circuit.

By way of a more specific illustration of an energy surge supply circuit used in the practice of the invention, the following identified components may be used in the circuit illustrated in FIGURE 5, as are particularly identified below:

| *Component identification* | *Specification of the components* |
|---|---|
| Variable Autotransformers $T_1$, $T_2$ | General Electric 9H60LA10K. |
| Transformer $T_3$ | Stancor P-8034. |
| Rectifiers $D_1$, $D_2$, $D_3$ | Mercury Vapor 872A. |
| Filament transformer $T_4$ | Stancor 5 volt, 15 ampere P6433. |
| Filament transformer $T_5$ | Stancor 5 volt, 10 ampere P6135. |
| Ignitrons $S_1$, $S_2$ | GL-5550. |
| Capacitors $C_1$, $C_2$, $C_3$ | 210 microfarads, 5 kv. |
| Capacitor $C_4$ | .05 microfarad, 3000 volts. |
| Choke $L_1$ | Stancor C2688. |
| Resistors $R_1$, $R_2$ | 5 megohms, 5 watts. |
| Resistor $R_3$ | 3 megohms. |
| Resistor $R_4$ | 2 megohms. |
| Resistor $R_5$ | 10 ohms, 10 watts. |
| Meter relay $M_1$ | Assembly Products, Inc. |
| Control relay $CR_1$, $CR_2$ | Optical Meter Relay. |
| Meter relay $M_2$ | Assembly 0-1 milliampere range. |
| Control relays $CR_3$, $CR_4$ | double set point. |

Figure 6:
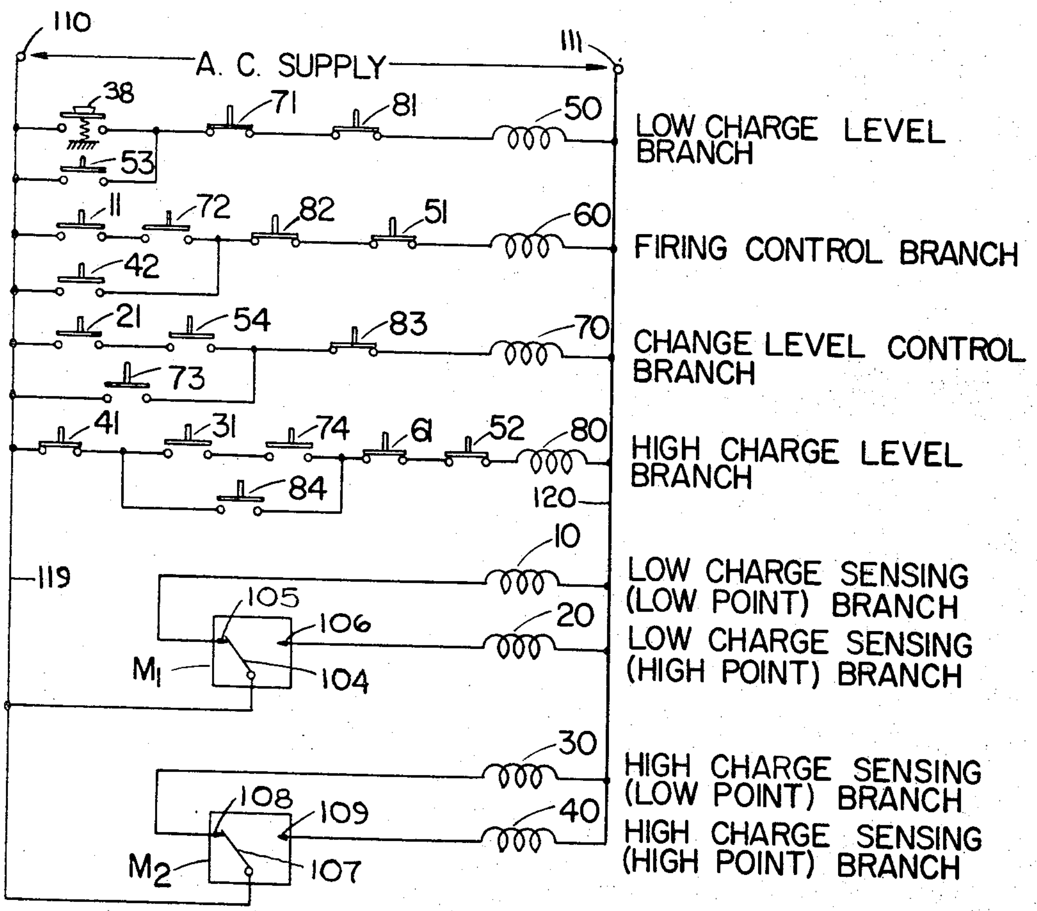
FIGURE 6 is a simplified schematic diagram of the relay coil control portion of the electrical surge supply circuit showing the control relay contacts and meter relays for the standby condition of the circuit.
Figure 7:
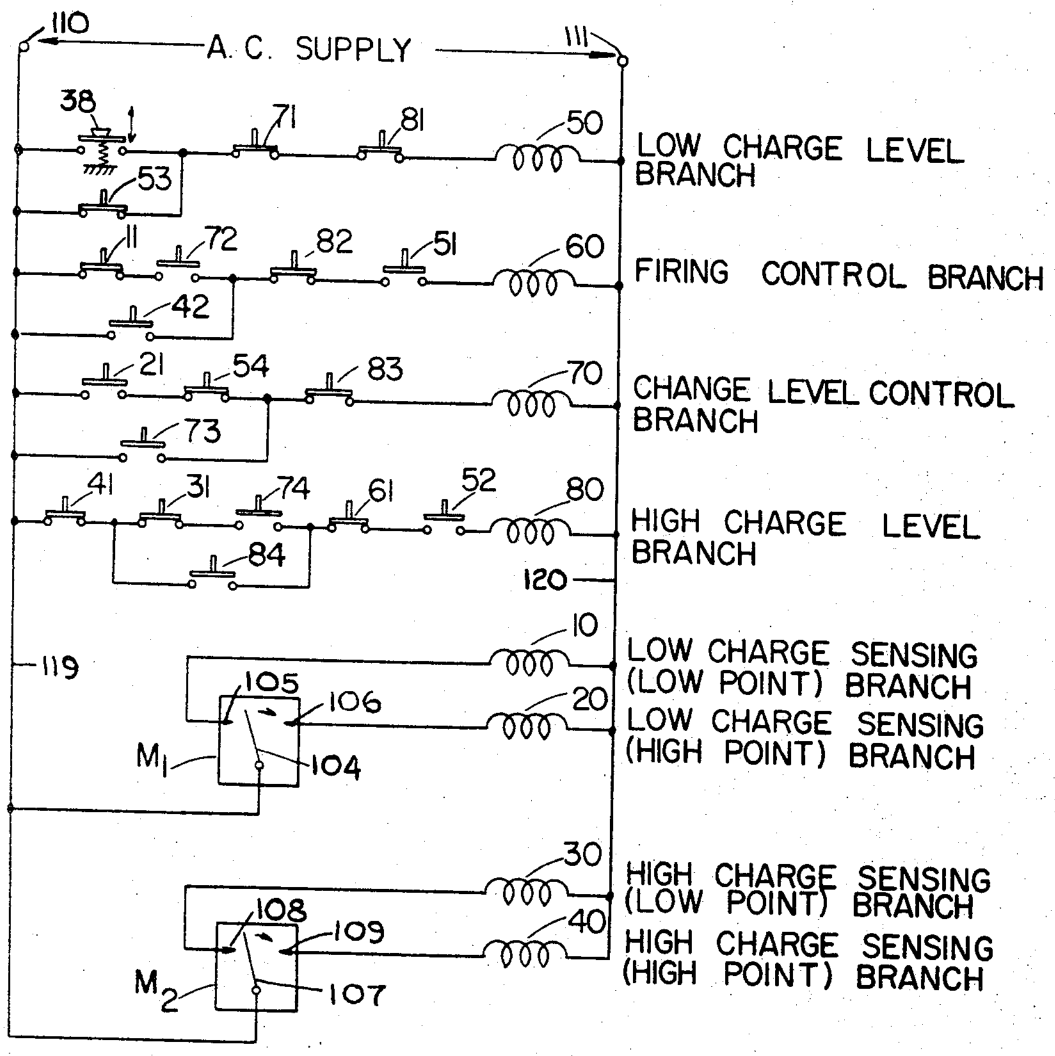
FIGURE 7 is a simplified schematic circuit diagram of the relay coil control portion of the electrical surge supply circuit showing the control relay contacts and the meter relay contacts for the low level charge condition.

Having more specific reference now to the simplified schematic circuit diagrams as shown in FIGURES 6 through 11, I will now more fully describe the operation of the control circuit portion. In FIGURE 6 I have illustrated a simplified schematic diagram for the standby condition of the control circuit portion. The simplified schematic diagram includes all of the relay contacts in the circuit shown in FIGURE 5 with the exception of those that are in the capacitor discharge circuit portion, relay contact 55, relay contact 85, and relay contact 62.

In all of the simplified circuit diagrams shown in FIGURES 6 through 11 the control circuit portion includes eight branches which I have identified in the drawings as the low charge level branch, firing control branch, change level control branch, high charge level branch, low charge sensing (low point) branch, low charge sensing (high point) branch, high charge sensing (low point) branch, and the high charge sensing (high point) branch.

In the standby condition of the circuit shown in FIGURE 6 the meter relays $M_1$ and $M_2$ are at their low point positions with the meter pointers 104, 107 engaging the contacts 105, 108 thereby placing the coils 10 and 30 across the alternating current supply lines 119, 120. Except for the relay contacts 11 which appear in the firing control branch of the control circuit and relay contacts 31 which are in the high charge branch, all of the other relay contacts are in their normal positions.

As will be seen in FIGURE 6, the low charge level branch includes pushbutton switch 38, relay contacts 71, relay contacts 81, and relay coil 50 connected in series across the alternating current supply. Contacts 53 are connected in shunt across pushbutton switch 38 so that when the pushbutton switch 38 is momentarily depressed by the operator, relay coil 50 is energized to close the normally open relay contacts 53. Relay coil 50 will remain energized until either of the normally closed relay contacts 71 or 81 are opened. With relay coil 50 energized, it will be appreciated that relay contacts 55 connect the autotransformer $T_1$ across the power supply and transformer $T_3$ of the capacitor discharge circuit is energized.

Turning now to the firing control branch, this branch circuit includes three normally closed relay contacts 11, 82 and 51 in series with relay coil 60 across the alternating current supply. It will be noted that relay contacts 11 as shown in FIGURE 5 are in the open position since relay coil 10 is energized during the standby condition. Relay contacts 42 are connected in shunt with contacts 11 and 72 and are actuated by meter relay $M_2$ when the meter pointer 107 reaches the high point position. Thus relay contacts 42 come into play to energize coil 60 during the high level charge firing condition of the circuit.

When relay coil 60 is energized, it will be appreciated that relay contacts 62 connected in series with starter rod of the ignitron $S_1$ are closed and the ignitron $S_1$ is triggered into conduction. Relay coil 60 is energized at the end of the low level charge period through a path which includes the four relay contacts 11, 72, 82 and 51. The normally closed relay contacts 82 and 51 are provided in the firing control branch to insure that the relay coil 60 is not energized during either the high level or the low level charging periods of the capacitor discharge circuit.

Referring now more particularly to the change level control branch, it will be seen that this branch includes a normally open relay contact 54, a normally closed relay contact 21, and one set of normally closed relay contacts 83 in series with control winding 70. Also, the normally open relay contacts 73 are connected in shunt with relay contacts 21 and 54. As will hereinafter be more fully explained, the change level control branch circuit comes into play only during the low level charge firing condition and implements the start of the high level charge cycle.

The high charge level branch circuit includes one set of normally open contacts 74 and four normally closed relay contacts in series with relay coil 80 across the alternating current supply, and relay contacts 84 are connected in shunt across the relay contacts 31 and 74. It will be noted that, as shown in FIGURE 6, relay contacts 31 are in the open position because relay coil 30 is energized in the standby condition. Relay contacts 41 serve to disconnect the high charge level branch from the power supply when the capacitor bank is charged up to a preselected high level. The manner in which this is accomplished will be more fully described in connection with the description of the high level of charge condition of the circuit. Relay contacts 61 function as a momentary switch to initiate the high level charge start condition, and relay contacts 84 provide a shunt path around the relay contacts 31 and 74 during the high level charge conditon. In order to insure that the high charge level branch circuit is not energized while the low charge level branch is energized, the normally closed contacts 52 are placed in series with relay coil 80.

In order to more fully explain the operation of the control circuit I will now describe the various control conditions of the circuit as are shown in FIGURES 6 to 11. Let us assume that the operator depresses the pushbutton 38, the control circuit portion being in the standby condition as shown in FIGURE 6. Relay coil 50 of the low charge level branch is energized and relay contacts 55 are actuated (see FIGURE 5) to a closed position to connect the autotransformer $T_1$ across supply lines 119 and 120 thereby applying a voltage of preselected magnitude across the primary winding $P_3$ of transformer $T_3$. The capacitor bank is now being charged and the pointers 104 and 107 have been moved away from their low point position out of engagement with contacts 105 and 108 and are shown in an intermediate position. Relay coils 10 and 30 are now de-energized. As a result, relay contacts 11 in the firing control branch and relay contacts 31 in the high charge level branch are closed. The only branch circuit energized during the low level charge condition is the low charge level branch. With relay coil 50 energized, it will be seen that relay contacts 51 in the firing control branch are open, relay contacts 54 in the charge level control branch are closed, and the relay contacts 52 in the high charge level branch are open.

Figure 8:
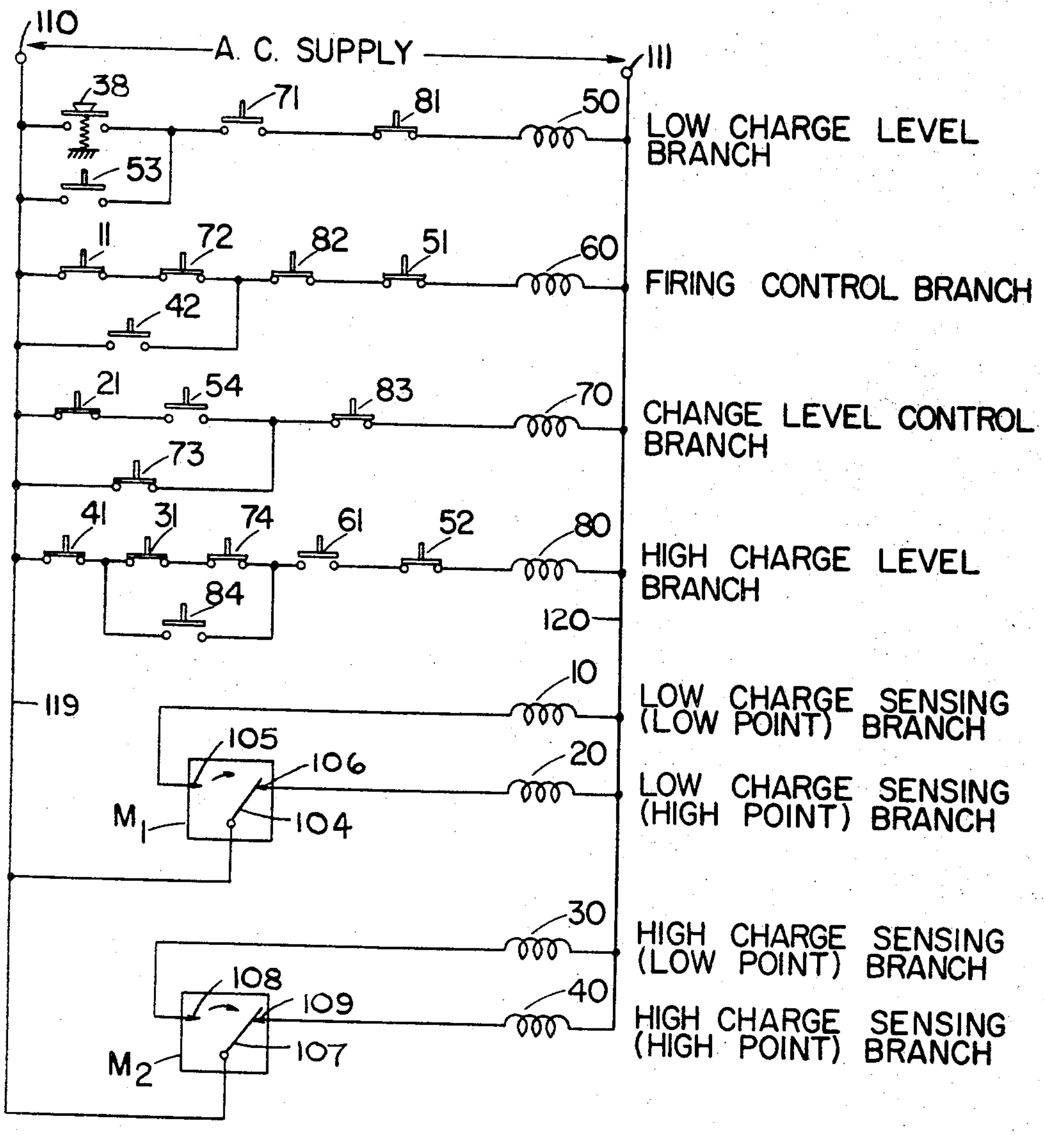
FIGURE 8 is a simplified schematic circuit diagram of the relay coil control portion of the electrical surge supply circuit showing the control relay contacts and the meter relays for the low level charge firing condition.

When the capacitor bank reaches a preselected low level charge, the pointer 104 of the meter relay $M_1$ engages contact 106. As is shown in FIGURE 8, with the pointer 104 now in this position, relay coil 20 is energized. Control relay $CR_2$ actuates contacts 21 to energized the change level control branch, and with current flowing through the relay coil 70 relay contacts 71 are actuated to the open position thereby disconnecting relay coil 50 from the power supply circuit. Relay contacts 51 in the firing control branch are closed and accordingly, current now flow through the relay coil 60 and control relay $CR_6$ is actuated to close relay contacts 62 in the firing circuit to fire ignitron $S_1$ and discharge the capacitor bank. It will be noted that in the change level control branch, relay contacts 54 have been actuated to an open position and relay contacts 73 have been actuated to a closed position. In the high charge level branch, contacts 74 are closed, contacts 61 are opened, and relay contacts 52 are closed.

Figure 9:
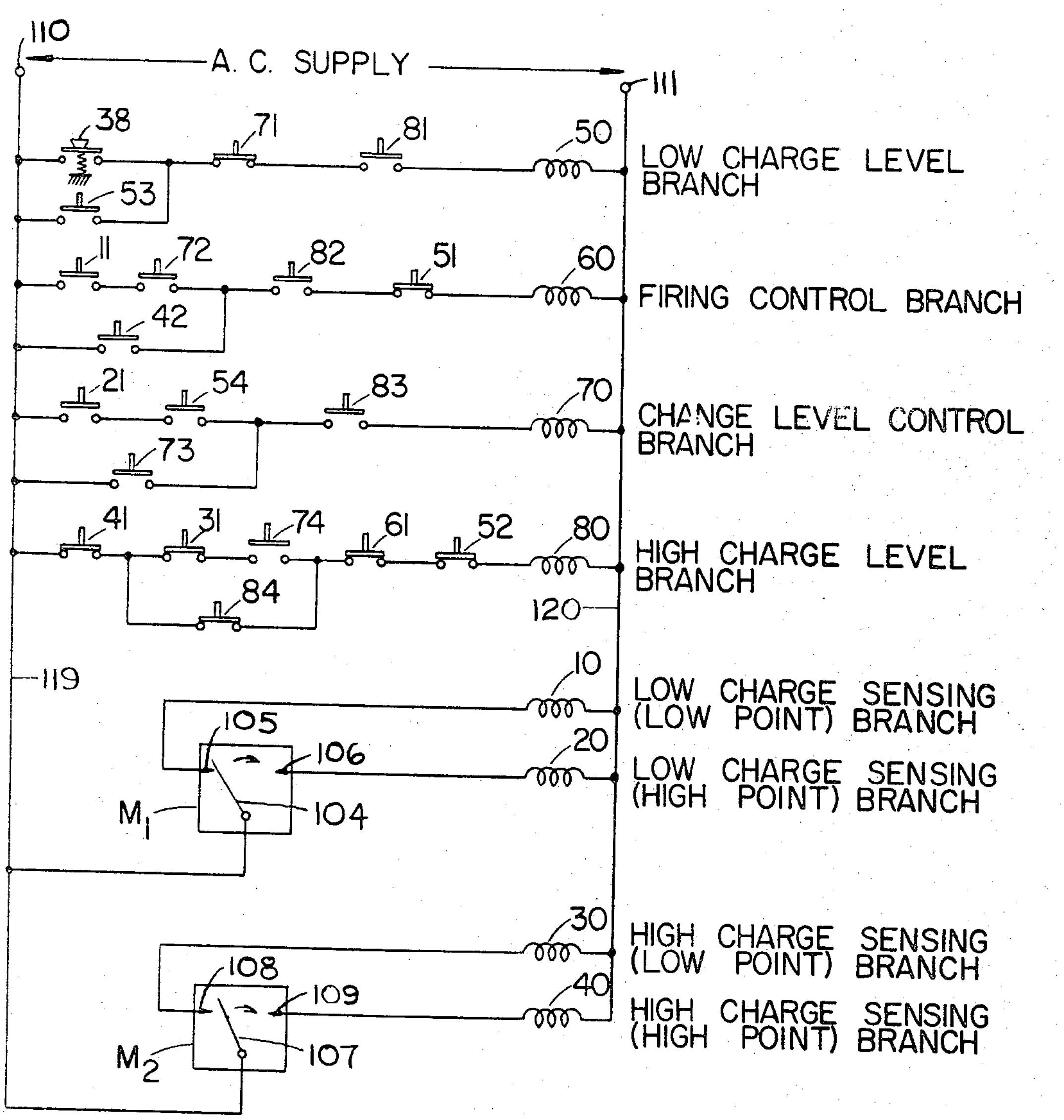
FIGURE 9 is a simplifed circuit diagram of the relay coil control portion of the electrical surge supply circuit showing the control relay contacts and meter relays for the high level charge start condition of the circuit.

When the capacitor bank discharges, the voltage drops quickly and the pointer 104 of the meter relay $M_1$ falls to the low point limit position to engage the low limit contact 105 and energize coil 10. It will be appreciated that the low limit setting of meter relay $M_1$ is slightly greater than the low limit setting of the meter relay $M_2$. Thus the pointer of the relay meter $M_2$ does not engage low limit contact 108 until an instant after the pointer 104 of the meter relay $M_1$ engages its low limit contact 105. With relay coil 10 energized the control circuit is in the high level charge start condition as shown in FIGURE 9. Relay $CR_1$ actuates relay contacts 11 to the open position thereby opening the firing control branch circuit to de-energize relay coil 60. Control relay $CR_6$ actuates relay contacts 61 in the high charge level branch to energize relay coil 80 thereby closing shunt relay contacts 84 and also closing contacts 85 (see FIGURE 5) to cause the voltage across variable transformer $T_2$ to be applied across primary winding $P_3$ of transformer $T_3$.

Figure 10:
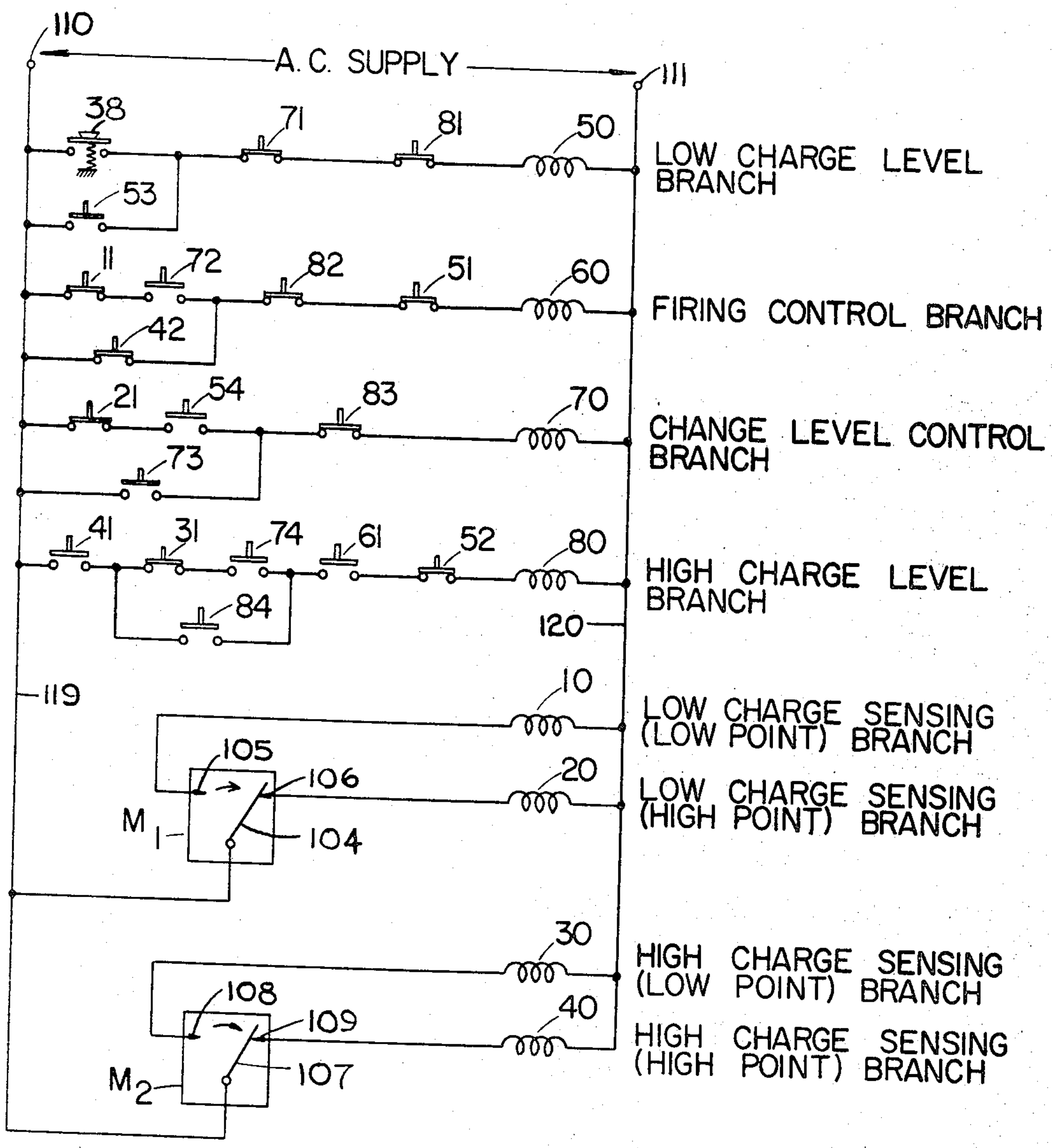
FIGURE 10 is a simplified schematic circuit diagram of the relay coil control portion of the electrical surge supply circuit showing the control relay contacts and meter relays for the high level charge firing condition of the circuit.

The capacitor bank is now being charged and when the voltage across the capacitor bank reaches a preselected high level, both pointers 104, 107 of meter relays $M_1$ and $M_2$ will be in the high limit positon as shown in FIGURE 10. Relay coils 20 and 40 are now energized. Relay contacts 41 are opened in the high charge level branch to de-energize relay $CR_8$, thereby opening contacts 85 to cut off the power supplied to the capacitor discharge circuit. Also, relay contacts 42 and 82 are closed in the firing control branch to discharge the capacitor bank.

Figure 11:
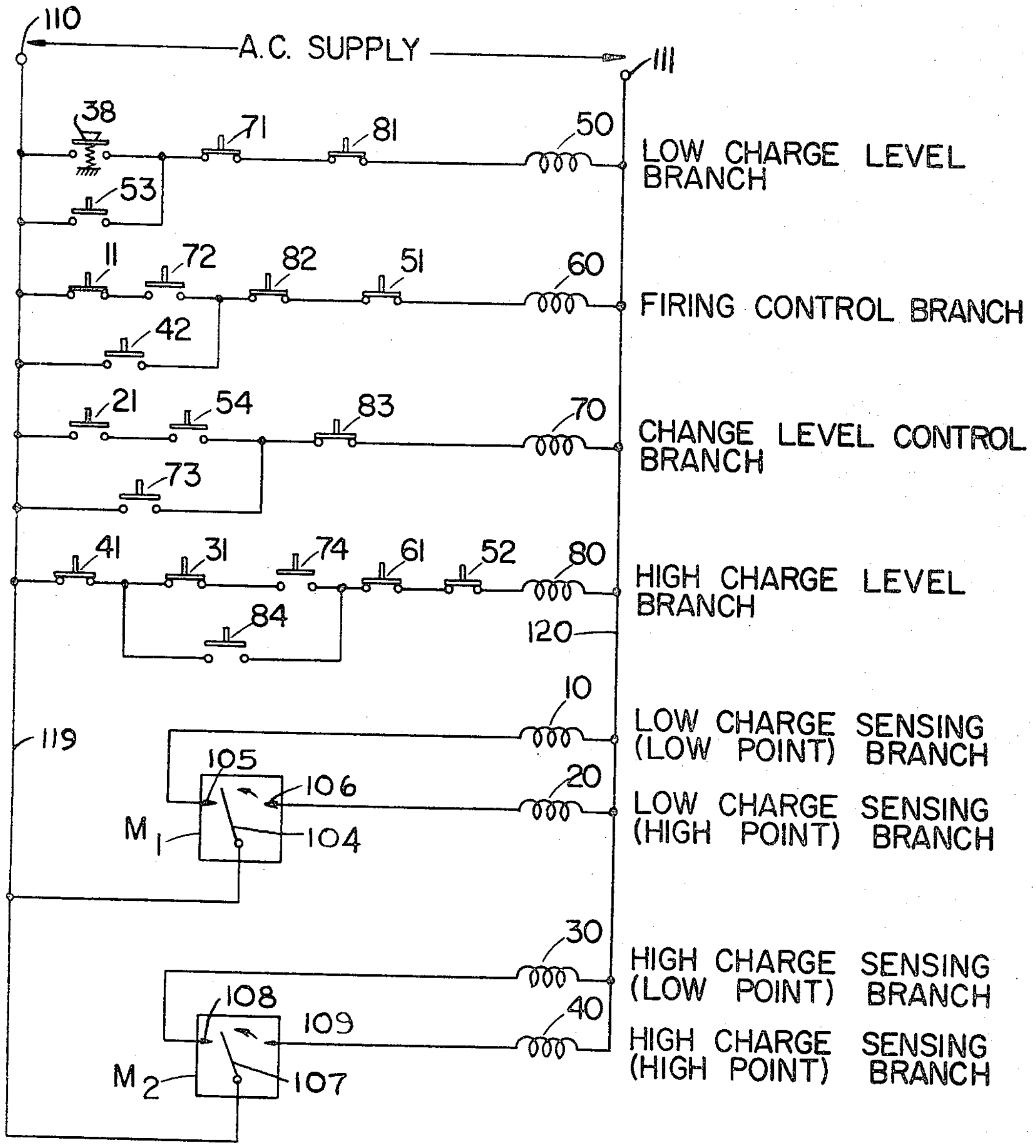
FIGURE 11 is a simplified schematic circuit diagram of the relay coil control portion of the electrical surge supply circuit showing the control relay contacts and the meter relays for the high level charge condition.

In FIGURE 11 I have shown the control relays for the high level charge condition of the circuit. During this condition the capacitors are discharging but the voltage across the capacitor bank has not yet fallen down to zero. It will be seen that relay coils 20, 40 and 60 are de-energized, and relay contacts 62 in the firing circuit of ignitron $S_1$ are opened. When the voltage drops down to zero, the pointers 105, 107 of the meter relays $M_1$ and $M_2$ will be at their low point positions, and the control circuit will revert to the standby condition. The control cycle can be repeated by depressing the pushbutton switch 38. The improved apparatus can be readily operated by one operator. Standing at the load circuit connection station, the operator can observe the load circuit at the electrical surge injection station while connecting the stator core in the load circuit.

From the foregoing description of the improved method exemplifying my invention, it will be apparent that various operations can be efficiently and safely carried out on inductive devices such as the stator cores of small electrical motors and other coil accommodating members. Although in the exemplifications of my invention, the high energy rate pulses were injected into the coils of the main stator winding, it will be appreciated that various coil transforming operations, such as coil shaping, pressing, compacting and placing operations, as may be required in the process of the manufacture of an inductive device can be accomplished without necessarily connecting the coil itself to the electrical surge supply circuit. For example, the coils on which the coil transforming operations are to be performed can be inductively coupled with a coil that forms part of the load circuit on the turntable. Further, it will be appreciated that although the apparatus for carrying out one form of my improved method was illustrated in connection with a supply circuit producing two high rate energy pulses by discharging a capacitor bank, it will be apparent to those skilled in the art that the apparatus may be modified to produce more than two surges and that other than a capacitor discharge circuit may be used.

While I have shown and described one embodiment of my invention, it will be obvious to those skilled in the art that changes and modifications may be made without departing from the invention. It is therefore intended in the appended claims to cover all such changes and modifications that fall within the true spirit and scope of my invention.

What I claim as new and desire to secure by Letters Patent of the United States is:

1. A method for effecting a coil transforming operation on at least one coil of a magnetic core member, said method comprising the steps of: arranging a first coil and magnetic core member in a first load circuit on a turntable at a first station, while injecting at least one electrical surge to a second load circuit having a second coil and magnetic core member arranged therewith; rotating said turntable, including said first load circuit, angularly away from said first station to said second station, while returning said second load circuit to said first station; removing said second coil and magnetic core member from said second load circuit; and arranging a third coil and magnetic core member in said second load circuit, while injecting at least one electrical surge through said first load circuit at said second station to effect transformation of the third coil.

2. The method of claim 1 in which the second load circuit is being maintained within an enclosure as the at least one electrical surge is being injected to the second load circuit having the second coil and magnetic core member arranged therewith.

3. A method for effecting coil transforming operations on one or more electrical coils of a magnetic core member for use in an inductive device, said method comprising the steps of: arranging at least one coil and a magnetic core member in a load circuit at a first station, said load circuit including terminal members for connection with an electrical surge supply circuit; transporting said load circuit with said at least one coil and magnetic core member to a second station; enclosing said load circuit at said second station, and establishing an electrical connection of the terminal members with the electrical surge supply circuit at said second station; and injecting at least one electrical surge through said load circuit at said second station to perform a coil transforming operation on said at least one coil.

4. The method of claim 3 in which at least one coil is returned to the first station after the coil transforming operation has been completed thereon at the second station, and said at least one coil is removed from said load circuit at the first station.

5. A method for effecting coil transforming operations on at least one electrical coil of a magnetic core member for use in an inductive device, said method comprising the steps of: arranging the at least one coil and a magnetic core member in a load circuit at a load station; transporting said load circuit having said at least one coil and magnetic core member arranged therein to an electrical surge supply station; establishing an electrical coupling of said load circuit with an electrical surge supply circuit at said electrical surge supplying station; and producing at least one electrical energy surge in said load circuit at said electrical surge supply station to perform a coil-transforming operation on said at least one coil.

6. The method of claim 5 including the step of maintaining the load circuit in an enclosure, including a part thereof formed of transparent material, at the electrical surge supply station while producing the at least one electrical energy surge in the load circuit to permit visual observation of the coil-transforming operation and to provide protection in the event that the at least one coil shorts out during its transformation.

References Cited

UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—596 X |

JOHN F. CAMPBELL, *Primary Examiner.*

J. L. CLINE, *Assistant Examiner.*